US010072812B2

(12) United States Patent
Owada

(10) Patent No.: US 10,072,812 B2
(45) Date of Patent: Sep. 11, 2018

(54) LENS BODY AND VEHICLE LIGHTING FIXTURE

(71) Applicant: Stanley Electric Co., Ltd., Tokyo (JP)

(72) Inventor: Ryotaro Owada, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 92 days.

(21) Appl. No.: 15/185,494

(22) Filed: Jun. 17, 2016

(65) Prior Publication Data
US 2016/0369963 A1 Dec. 22, 2016

(30) Foreign Application Priority Data

Jun. 17, 2015 (JP) .................. 2015-121787

(51) Int. Cl.
| F21V 7/00 | (2006.01) |
| F21S 8/10 | (2006.01) |
| B60Q 1/14 | (2006.01) |
| F21S 41/14 | (2018.01) |
| F21S 41/147 | (2018.01) |
| F21S 41/20 | (2018.01) |
| F21S 41/25 | (2018.01) |
| F21S 41/27 | (2018.01) |

(Continued)

(52) U.S. Cl.
CPC .............. *F21S 48/125* (2013.01); *B60Q 1/14* (2013.01); *F21S 41/14* (2018.01); *F21S 41/147* (2018.01); *F21S 41/25* (2018.01); *F21S 41/27* (2018.01); *F21S 41/285* (2018.01); *F21S 41/32* (2018.01); *F21S 41/322* (2018.01); *F21S 45/47* (2018.01); *F21Y 2115/30* (2016.08)

(58) Field of Classification Search
CPC ........ F21S 48/1159; F21S 41/25; F21S 41/14; F21S 41/147; F21S 41/27; F21S 41/22; F21S 41/285; F21S 41/32
USPC ........................................................ 362/516
See application file for complete search history.

(56) References Cited

U.S. PATENT DOCUMENTS

| 7,261,449 B2 * | 8/2007 | Albou ...................... B60Q 1/26 359/364 |
| 2004/0156209 A1 | 8/2004 | Ishida |
| 2011/0063115 A1 | 3/2011 | Kishimoto |

FOREIGN PATENT DOCUMENTS

| DE | 10 2006 023 163 A1 | 11/2006 |
| EP | 1 357 333 A2 | 10/2003 |

(Continued)

*Primary Examiner* — Anh Mai
*Assistant Examiner* — Matthew Peerce
(74) *Attorney, Agent, or Firm* — Kenealy Vaidya LLP

(57) ABSTRACT

A lens body includes: an incident surface where light entering within a predetermined angular range with respect to an optical axis of the light source is refracted in a condensing direction; a first reflection surface that internally reflects the light; and a second reflection surface that internally reflects part of the reflected light from the first reflection surface. The lens body includes an emission surface of a convex lens surface. The second reflection surface extends backward from near a focal point of the emission surface. Light obtained by blocking part of the light internally reflected by the first reflection surface with a front edge of the second reflection surface, and the light internally reflected by the second reflection surface are emitted from the emission surface to from a predetermined light distribution pattern including a cutoff line defined by the second reflection surface at the upper edge.

15 Claims, 9 Drawing Sheets

(51) Int. Cl.
*F21S 41/32* (2018.01)
*F21Y 115/30* (2016.01)
*F21S 45/47* (2018.01)

(56) References Cited

FOREIGN PATENT DOCUMENTS

| | | |
|---|---|---|
| EP | 1 715 245 A1 | 10/2006 |
| EP | 2 818 792 A2 | 12/2014 |
| EP | 3 109 542 A1 | 12/2016 |
| JP | 2004-241349 A | 8/2004 |
| JP | 4047186 B2 | 2/2008 |
| JP | 2010-108639 A | 5/2010 |
| JP | 2011-66069 A | 3/2011 |

\* cited by examiner

LENS BODY AND VEHICLE LIGHTING FIXTURE

This application claims the priority benefit under 35 U.S.C. § 119 of Japanese Patent Application No. 2015-121787 filed on Jun. 17, 2015, which is hereby incorporated in its entirety by reference.

TECHNICAL FIELD

The presently disclosed subject matter relates to a lens body and a vehicle lighting fixture, and more particularly to a lens body that can be arranged in front of a light source and configured to control light from the light source to form a predetermined light distribution pattern, and a vehicle lighting fixture using the same.

BACKGROUND ART

A lens body that is arranged in front of a light source and configured to control light from the light source to form a predetermined light distribution pattern including a cutoff line at the upper edge thereof has heretofore been proposed (for example, see Japanese Patent Application Laid-Open No. 2004-241349 or US2004/156209A1 corresponding thereto).

FIG. 1 is a longitudinal cross-sectional view of a lens body 220 (vehicle lighting fixture 200) described in Japanese Patent Application Laid-Open No. 2004-241349.

As illustrated in FIG. 1, the lens body 220 described in Japanese Patent Application Laid-Open No. 2004-241349 is to be arranged in front of a light source 210 including a semiconductor light emitting element. The surface of the lens body 220 includes an incident surface 221 of semispherical shape, a first reflection surface 222, a second reflection surface 223, and a convex lens surface 224. The light source 210 is arranged with its light emitting surface upward. The incident surface 221 covers the light source 210 from above. The first reflection surface 222 is arranged in a traveling direction of light from the light source 210, the light entering the interior of the lens body 220 from the incident surface 221. The second reflection surface 222 extends forward from a lower edge of the first reflection surface 222.

The lens body 220 (vehicle lighting fixture 200) having the foregoing configuration has the following problem.

The first reflection surface 222 and the second reflection surface 223 are configured as reflection surfaces (having a reflectance of about 95% at most) formed by metal deposition applied to the surface of the lens body 220. There is therefore a problem of low light use efficiency because the reflection surfaces 222 and 223 formed by the metal deposition cause reflection loss (light loss). There is also a problem of a cost increase because the application of the metal deposition needs facilities, processes, metal materials, etc. The reflection surfaces 222 and 223 (reflection films) formed by the metal deposition also have a problem of low durability.

SUMMARY

The presently disclosed subject matter was devised in view of these and other problems and features in association with the conventional art. According to an aspect of the presently disclosed subject matter, there can be provided a lens body in which the metal deposition, a cause of cost increase etc., can be omitted and which can suppress the occurrence of reflection loss (light loss), and a vehicle lighting fixture including the same.

To achieve the foregoing object, a lens body can be configured to include a rear end portion and a front end portion and an optical axis passing through the rear end portion to the front end portion and aligned in a light emitting direction of the lens body, light entering an interior of the lens body being emitted from the front end portion and projected forward in the optical axis to form a predetermined light distribution pattern including a cutoff line at an upper edge thereof, the lens body including: an incident portion including an incident surface having a normal line tilted by a predetermined angle with respect to a reference axis orthogonal to the optical axis and included in a plane containing the normal line and the optical axis where light within a predetermined angular range with respect to the optical axis is refracted in a condensing direction and enters the interior of the lens body; a first reflection surface that can internally reflect the light, the light entering the interior of the lens body; and a second reflection surface that can internally reflect at least part of the light, the light being internally reflected by the first reflection surface, wherein the normal line of the incident surface is tilted with respect to the reference axis so that an incident angle of the light entering the interior of the lens body to the first reflection surface is greater than or equal to a critical angle, the front end portion can include an emission surface that can be a convex lens surface, the second reflection surface can be configured as a reflection surface extending backward from near a focal point of the emission surface, and light obtained by blocking part of the light with a front edge of the second reflection surface, the light entering the interior of the lens body and being internally reflected by the first reflection surface, and the light internally reflected by the second reflection surface can be emitted from the emission surface and projected forward to form the predetermined light distribution pattern including a cutoff line defined by the front edge of the second reflection surface at the upper edge.

In the lens body with the above-described configuration, metal deposition, a cause of cost increase etc., can be omitted and the occurrence of reflection loss (light loss) can be suppressed.

There may be two reasons. The first reason is that the light within the predetermined angular range with respect to the normal line of the incident surface (or the optical axis of the light source) (for example, light of high relative intensity within the range of ±60°) in the light entering is refracted in a condensing direction and enters the interior of the lens body. The incident angle of the light within the predetermined angular range to the first reflection surface can thus be made greater than or equal to the critical angle (the light within the predetermined angular range can be totally reflected). The second reason is that the normal line of the incident surface is tilted with respect to the reference axis so that the incident angle of the light entering the interior of the lens body (refracted light) to the first reflection surface is greater than or equal to the critical angle (the refracted light is totally reflected).

Furthermore, the lens body with the above-mentioned configuration can form a predetermined light distribution pattern (for example, a low beam light distribution pattern or a fog lamp light distribution pattern) including a cutoff line at the upper edge.

In the lens body with the above-mentioned configuration, the first reflection surface can have a surface shape configured such that the light being internally reflected by the first reflection surface is condensed on near the focal point of the emission surface at least in a vertical direction.

In the lens body with this configuration, the predetermined light distribution pattern can be made relatively bright near the cutoff line.

In the lens body with the above-mentioned configuration, the first reflection surface can be configured as a reflection surface of elliptical shape having a first focal point set near the focal point of the emission surface and a second focal point set near a virtual focal point that is an intersection formed by extending refracted rays of light in reverse directions, the refracted rays of light being the light entering the interior of the lends body from the incident portion.

The lens body with this configuration can provide the same effect as that described above.

In the lens body with the above-mentioned configuration, the emission surface can have a surface shape configured such that light past near the focal point of the emission surface is emitted in a direction generally parallel to the optical axis of the lens body at least in terms of a vertical direction.

The lens body with this configuration can provide the same effect as that described above.

In the lens body with the above-mentioned configuration, a distance between the first focal point and the second focal point of the first reflection surface and an eccentricity of the first reflection surface can be determined so that the light being internally reflected by the first reflection surface and condensed on near the focal point of the emission surface is collected by the emission surface.

In the lens body with this configuration, the emission surface can collect a greater amount of light for improved light use efficiency.

In the lens body with the above-mentioned configuration, the first reflection surface can have a first reference axis that is tilted about near the focal point of the emission surface with respect to the optical axis so that the light being internally reflected by the reflection surface and condensed on near the focal point of the emission surface is collected by the emission surface.

In the lens body with this configuration, the emission surface can collect a greater amount of light for improved light use efficiency.

In the lens body with the above-mentioned configuration, the second reflection surface can be tilted with respect to the optical axis so that light internally reflected by the second reflection surface in light from a front end point of the incident surface (or a front end point of the light source), the light entering the interior of the lens body and being internally reflected by the first reflection surface, is collected by the emission surface.

In the lens body with this configuration, the emission surface can collect a greater amount of light for improved light use efficiency.

In the lens body with the above-mentioned configuration, the second reflection surface can be tilted with respect to the optical axis so as not to block light that is obtained by blocking part of light from a center point and the front end point of the incident surface (or a center point and the front end point of the light source) with the front edge of the second reflection surface, the light entering the interior of the lens body and being internally reflected by the first reflection surface, and is emitted from the emission surface and projected forward.

In the lens body with this configuration, the emission surface can collect a greater amount of light for improved light use efficiency.

According to another aspect of the presently disclosed subject matter, a lens body can be configured to include a rear end portion and a front end portion and an optical axis passing through the rear end portion to the front end portion and aligned in a light emitting direction, light entering an interior of the lens body being emitted from the front end portion and projected forward in the optical axis to form a predetermined light distribution pattern including a cutoff line at an upper edge thereof, the lens body including: an incident portion including an incident surface having a normal line tilted by a predetermined angle with respect to a reference axis orthogonal to the optical axis and included in a plane containing the normal line and the optical axis where light within a predetermined angular range with respect to the optical axis is refracted in a condensing direction and enters the interior of the lens body; and a first reflection surface that can internally reflect the light, the light entering the interior of the lens body, wherein the normal line of the incident surface is tilted with respect to the reference axis so that an incident angle of the light, the light entering the interior of the lens body, to the first reflection surface is greater than or equal to a critical angle, the front end portion can include an emission surface that is a convex lens surface, and the light, the light entering the interior of the lens body from the incident portion and being internally reflected by the first reflection surface, can be emitted from the emission surface and projected forward to form the predetermined light distribution pattern.

In the lens body with this configuration, metal deposition, a cause of cost increase etc., can be omitted and the occurrence of reflection loss (light loss) can be suppressed.

There may be two reasons. The first reason is that the light within the predetermined angular range with respect to the normal line of the incident surface (or the optical axis of the light source) (for example, light of high relative intensity within the range of ±60°) in the light entering is refracted in a condensing direction and enters the interior of the lens body. The incident angle of the light within the predetermined angular range to the first reflection surface can thus be made greater than or equal to the critical angle (the light within the predetermined angular range can be totally reflected). The second reason is that the normal line of the incident surface is tilted with respect to the vertical axis so that the incident angle of the light entering the interior of the lens body (refracted light) to the first reflection surface is greater than or equal to the critical angle (the refracted light is totally reflected).

The lens body with the above-mentioned configuration can form a predetermined light distribution pattern (for example, a high beam light distribution pattern).

According to still another aspect of the presently disclosed subject matter, a vehicle lighting fixture can be configured to include the lens body with any of the above-described configurations and the light source.

According to the presently disclosed subject matter, a lens body in which metal deposition, a cause of cost increase etc., can be omitted and which can suppress the occurrence of reflection loss (light loss), and a vehicle lighting fixture including the same can be provided.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to a vehicle lighting fixture of the presently disclosed subject matter with reference to the accompanying drawings in accordance with exemplary embodiments.

Figure 1:
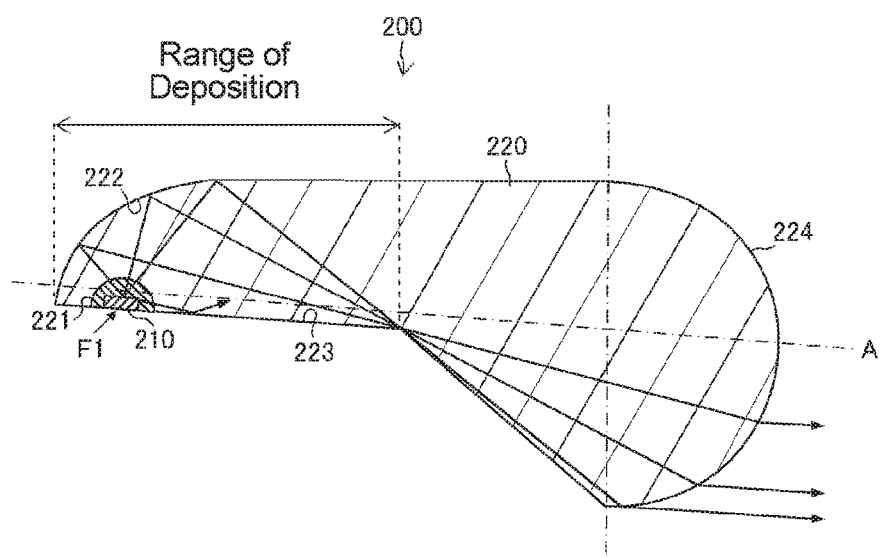
FIG. 1 is a longitudinal cross-sectional view of a lens body 220 (vehicle lighting fixture 220) described in Japanese Patent No. 4047186.
Figure 2A:
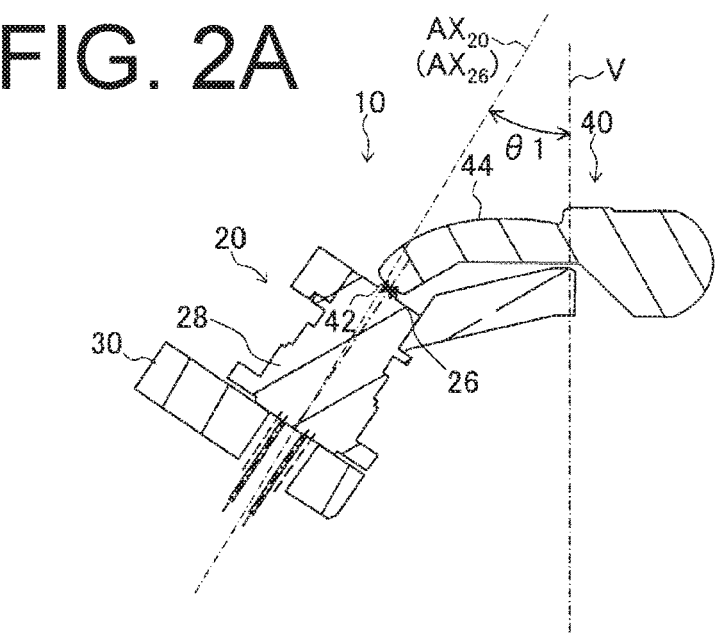
FIG. 2A is a side view and FIG. 2B is a partial enlarged view of a vehicle lighting fixture 10 which is an exemplary embodiment of the presently disclosed subject matter.
Figure 2B:
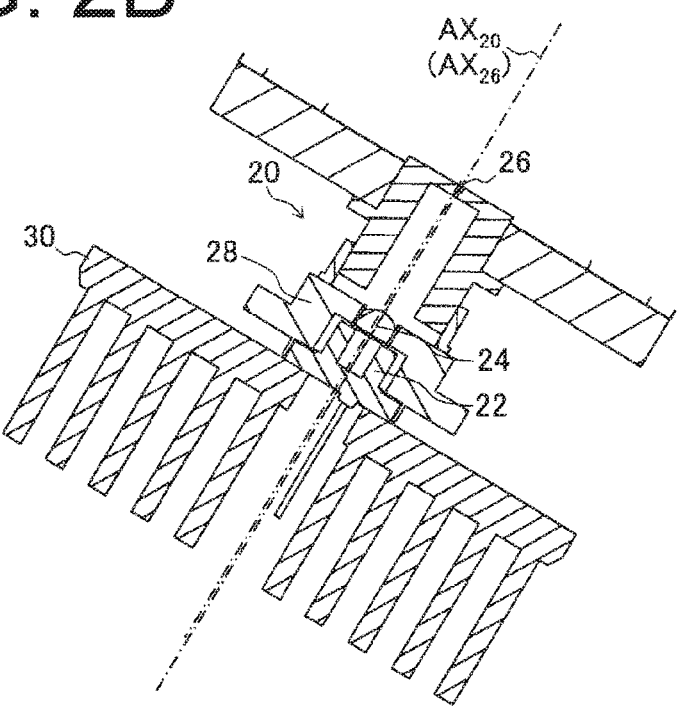
Figure 3:
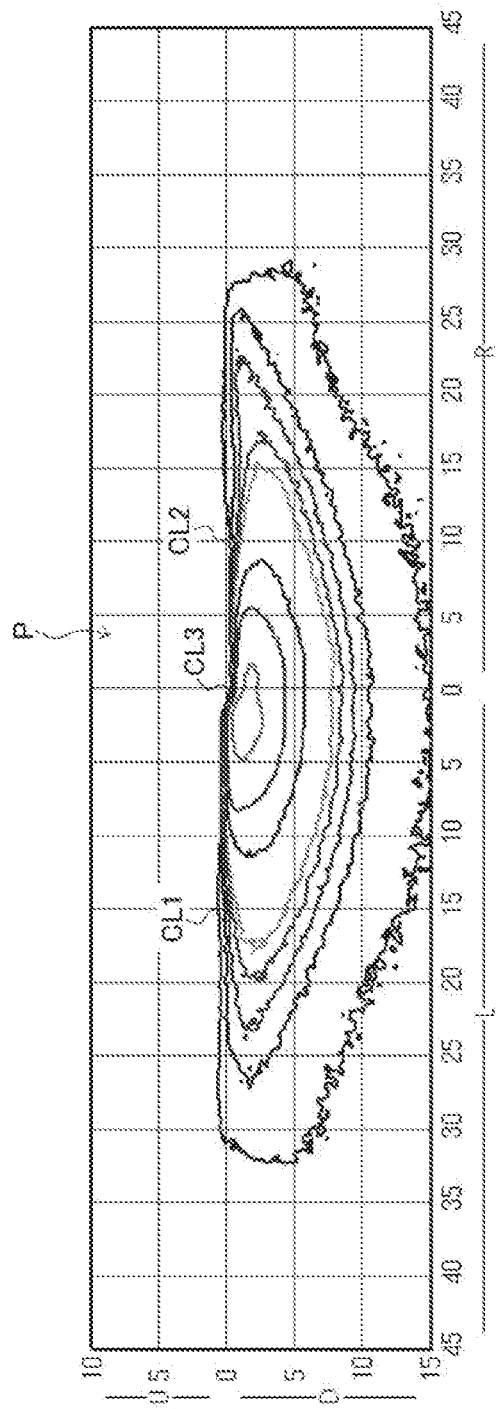
FIG. 3 shows an example of a low beam light distribution pattern P which the vehicle lighting fixture 10 (lens body 40) forms on a virtual vertical screen directly opposed to the front of the vehicle body (arranged approximately 25 m away from the front face of the vehicle body)

FIG. 2A is a side view of a vehicle lighting fixture 10 which is an exemplary embodiment of the presently disclosed subject matter. FIG. 2B is a partial enlarged view of the same. FIG. 3 shows an example of a low beam light distribution pattern P which the vehicle lighting fixture 10 (lens body 40) forms on a virtual vertical screen directly opposed to the front of the vehicle body (arranged approximately 25 m away from the front face of the vehicle body).

The vehicle lighting fixture 10 according to the present exemplary embodiment can be a lamp unit configured to form a low beam light distribution pattern P (see FIG. 3) including cutoff lines CL to CL3 at the upper edge. As shown in FIG. 2A, the vehicle lighting fixture 10 can include a light emitting device 20 and a lens body 40.

As shown in FIG. 2B, the light emitting device 20 can include a semiconductor laser element 22, a condenser lens 24, and a wavelength conversion member 26. The semiconductor laser element 22, the condenser lens 24, and the wavelength conversion member 26 can be arranged in this order along an optical axis $AX_{20}$ of the light emitting device 20.

The semiconductor laser element 22 can be a semiconductor laser light source such as a laser diode which can emit laser light in a blue region (for example, with an emission wavelength of 450 nm). For example, the semiconductor laser element 22 can be packaged and sealed in a CAN type package. The semiconductor laser element 22 can be held by a holding member 28 such as a holder. A semiconductor light emitting element such as an LED element may be used instead of the semiconductor laser element 22.

The condenser lens 24 can be a lens configured to condense laser light from the semiconductor laser element 22. The condenser lens 24 can be held by the holding member 28 such as a holder, and arranged between the semiconductor laser element 22 and the wavelength conversion member 26.

The wavelength conversion member 26 can be a wavelength conversion member configured to receive the laser light from the semiconductor laser element 22, the laser light being condensed by the condenser lens 24, and convert at least part of the laser light into light of a different wavelength. For example, the wavelength conversion member 26 can be configured to include a fluorescent substance of rectangular plate shape, having a light emission size of 0.4×0.8 mm. In FIGS. 2A and 2B, the wavelength conversion member 26 can be arranged with its longitudinal direction (0.8-mm side) perpendicular to the plane of the diagrams.

The wavelength conversion member 26 can be held by the holding member 28 such as a holder, and arranged in a position separated from the semiconductor laser element 22 (for example, in a position 5 to 10 mm from the semiconductor laser element 22).

Receiving the laser light from the semiconductor laser element 22, the laser light being condensed by the condenser lens 24, the wavelength conversion member 26 can function as a light source for emitting white light (pseudo white light). The white light (pseudo white light) can be obtained by mixing the color of the laser light of the blue region transmitted through the wavelength conversion member 26 and that of luminescence (yellow light) resulting from the laser light of the blue region. Hereinafter, the wavelength conversion member 26 may also be referred to as a light source 26.

As shown in FIG. 2A, the light emitting device 20 (wavelength conversion member 26) can be held by a holding member 30, such as a heat sink, in a position separated from an incident surface 42 of the lens body 40 (for example, in a position 0.1 mm from the incident surface 42 of the lens body 40).

An optical axis $AX_{26}$ of the light source 26 (which coincides with the optical axis $AX_{20}$ of the light emitting device 20) can be tilted at an angle of θ1 with respect to a vertical axis V (which corresponds to the reference axis orthogonal to the optical axis of the lens body and included in a plane containing a normal of the incident portion and the optical axis of the lens body) so that the light from the light source 26, the light entering the interior of the lens body 40, can be internally reflected by a first reflection surface 44.

Figure 4A:
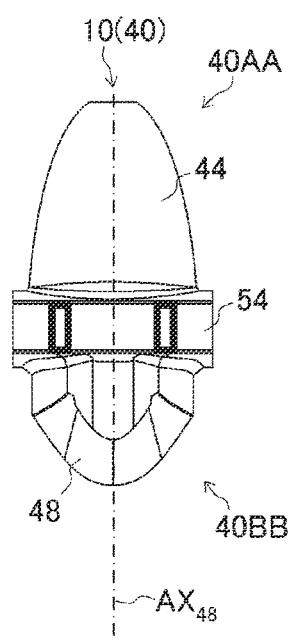
FIG. 4A is a top view.
Figure 4C:
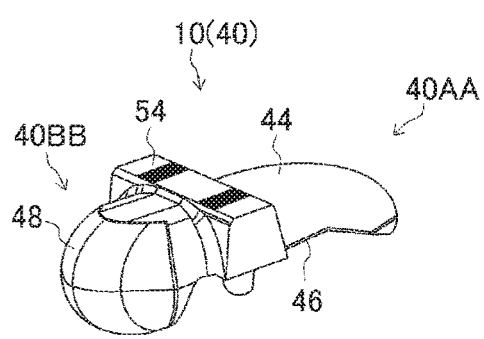
FIG. 4C is a perspective view.
Figure 4B:
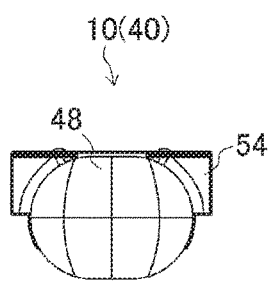
FIG. 4B is a front view.
Figure 4D:
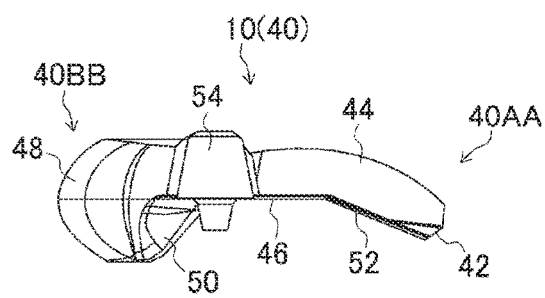
FIG. 4D is a side view of the lens body 40.
Figure 5:
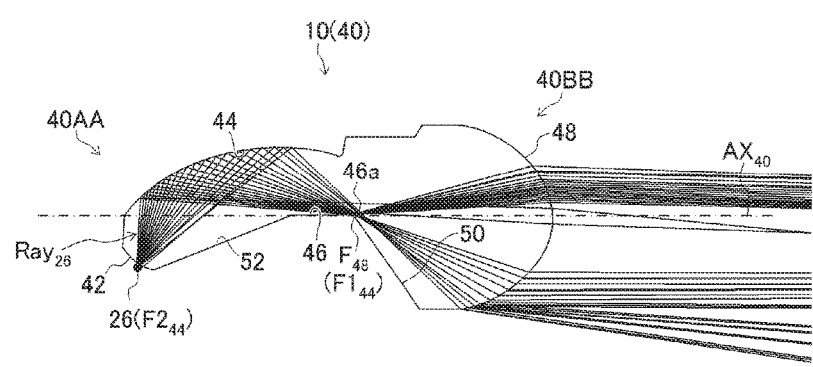
FIG. 5 is a longitudinal cross-sectional view showing how light from a light emitting device 20 (wavelength conversion member 26) travels inside the lens body 40.

FIG. 4A is a top view, FIG. 4B is a front view, FIG. 4C is a perspective view, and FIG. 4D is a side view of the lens body 40. FIG. 5 is a cross-sectional view showing how the light from the light emitting device 20 (wavelength conversion member 26) travels inside the lens body 40.

The lens body 40 can be arranged in front of the light source 26. As shown in FIGS. 4A to 4D and FIG. 5, the lens body 40 can include a rear end portion 40AA and a front end portion 40BB. The lens body 40 can be a solid lens body configured so that light $Ray_{26}$ from the light source 26, the light $Ray_{26}$ entering the interior of the lens body 40 from the rear end portion 40AA (incident surface 42), is emitted from the front end portion 40BB (emission surface 48) and projected forward to form the low beam light distribution pattern P (see FIG. 3) including the cutoff lines CL1 to CL3 at the upper edge. The lens body 40 may be made of glass or transparent resin such as an acrylic resin and a polycarbonate resin.

The rear end portion 40AA of the lens body 40 can include the incident surface 42 (corresponding to the incident portion of the presently disclosed subject matter) and the first reflection surface 44. The front end portion 40BB of the lens body 40 can include the emission surface 48 which is a convex lens surface. A second reflection surface 46 can be arranged between the rear end portion 40AA and the front end portion 40BB of the lens body 40.

Figure 6A:
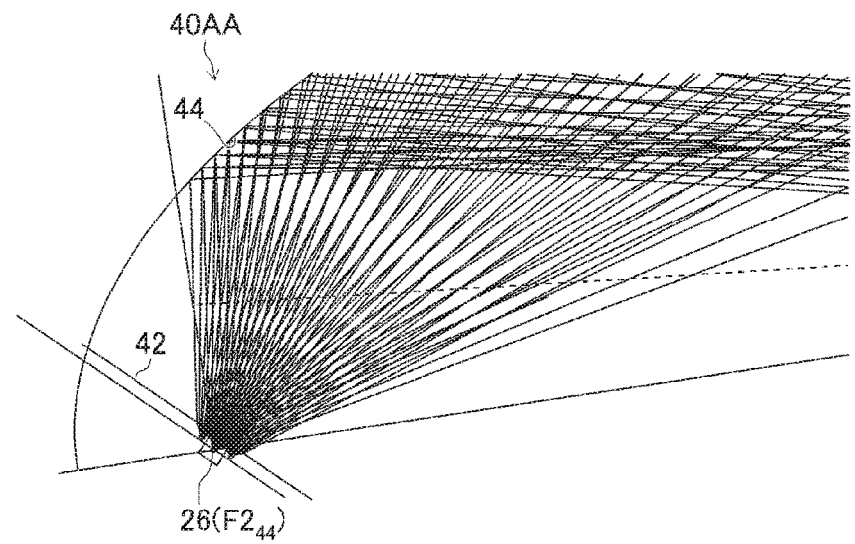
FIGS. 6A and 6B are partial enlarged views of the lens body 40.
Figure 6B:
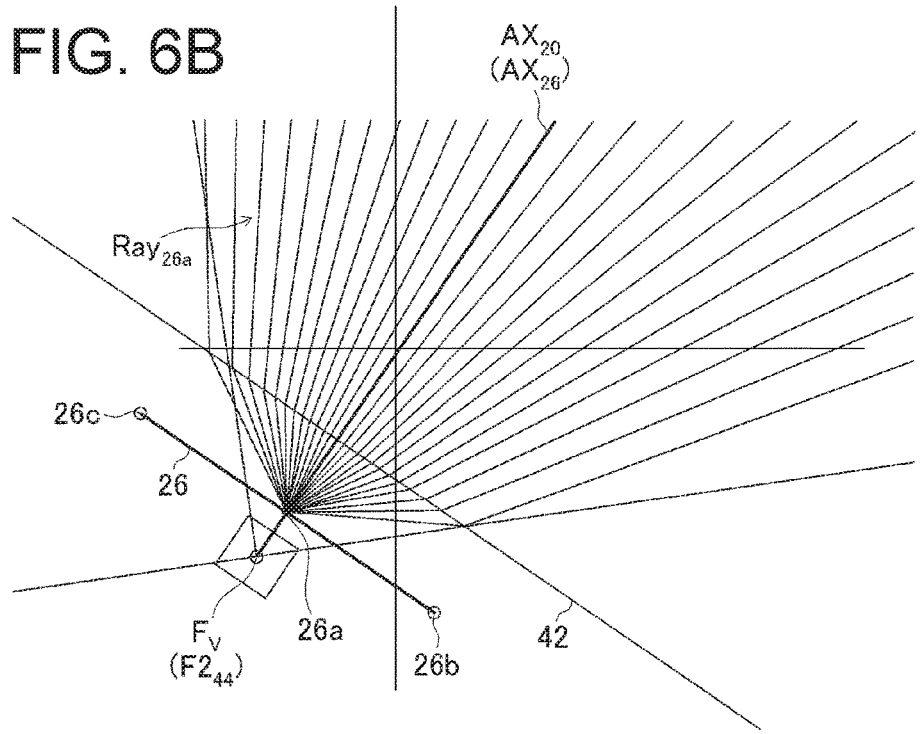
Figure 7:
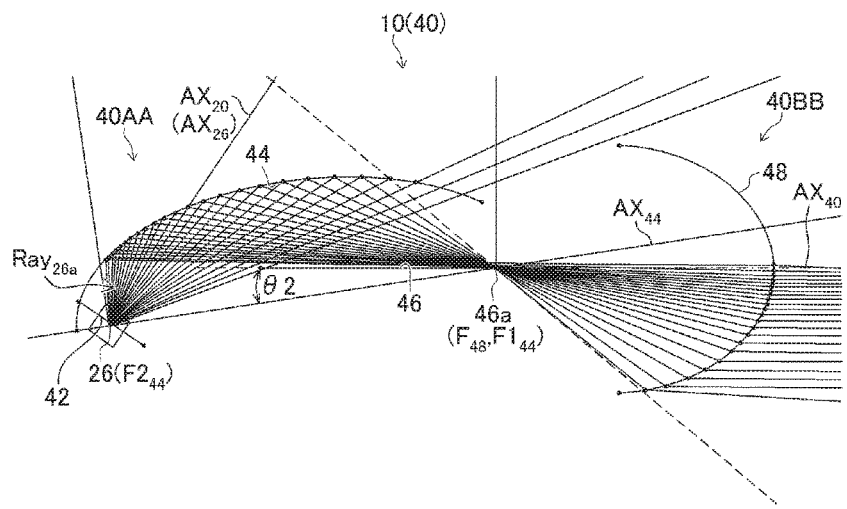
FIG. 7 is a longitudinal cross-sectional view showing how light from a light source 26 (light source center point 26a of the wavelength conversion member 26) is refracted in condensing directions at an incident surface 42 and travels inside the lens body 40.

FIGS. 6A and 6B are partial enlarged views of the lens body 40. FIG. 7 is a cross-sectional view showing how the light from the light source 26 (a light source center point 26a of the wavelength conversion member 26) is refracted in condensing directions at the incident surface 42 and travels inside the lens body 40.

As shown in FIG. 6B, the incident surface 42 can be a surface where light within a predetermined angular range (for example, light of high relative intensity within the range of ±60° with respect to the optical axis $AX_{26}$ of the light source 26) in light $Ray_{26a}$ from the wavelength conversion member 26 (the light source center point 26a of the light source 26) can be refracted in condensing directions and enters the lens body 40. For example, the incident surface 42 can be configured as a surface of flat shape (or curved shape) parallel to a light emission surface of the light source 26 (in FIG. 6B, see the straight line connecting a light source front end point 26b and a light source rear end point 26c).

Specifically, the incident portion can include the incident surface 42 having a normal line (which can coincident with the optical axis $AX_{26}$ of the light source 26) tilted by a predetermined angle with respect to the reference axis (or vertical axis V) orthogonal to the reference axis $AX_{40}$ (which can be an optical axis of the lens body 40, which is aligned in a light emitting direction and in which almost all the light exiting from the lens body 40 is directed) and included in a plane containing the normal line and the reference axis AX40 where light within a predetermined angular range with respect to the optical axis can be refracted in a condensing direction and enters the interior of the lens body. In this configuration, the entering light can be incident on the first reflection surface 44 so that an incident angle of the light to the first reflection surface is greater than or equal to a critical angle.

It will be understood that the incident surface 42 is not limited thereto. The incident surface 42 may be a surface of which a cross section taken along a vertical plane including a reference axis $AX_{40}$ (or a flat plane parallel thereto) has a straight shape and a cross section taken along a flat plane orthogonal to the reference axis $AX_{40}$ has an arc shape convex toward the light source 26. Other surfaces may be used. The cross section taken along the flat plane orthogonal to the reference axis $AX_{40}$ can be a shape to take account of the lateral distribution of the low beam light distribution pattern P.

The first reflection surface 44 can be configured to internally reflect (totally reflect) the light from the light source 46, the light entering the interior of the lens body 40. The first reflection surface 44 can be configured so that the light from the light source 26, the light being internally reflected by the first reflection surface 44, can be condensed on near a focal point $F_{48}$ of the emission surface 48 at least in the vertical direction. This can make the low beam light distribution pattern P relatively bright near the cutoff lines.

Specifically, the first reflection surface 44 can be a reflection surface of elliptical shape (including similar free form surfaces, and may be referred to as generally elliptical shape). The first reflection surface 44 can have a first focal point $F1_{44}$ set near the focal point $F_{48}$ of the emission surface 48 (see FIG. 7) and a second focal point $F2_{44}$ set near a virtual focal point $F_V$ (see FIG. 6B) which is an intersection formed by extending refracted rays of light in reverse directions. Here, the refracted rays of light are the light from the light source 26 (light source center point 26a of the wavelength conversion member 26), the light entering the interior of the lens body 40 from the incident surface 42. The eccentricity of the first reflection surface 44 can be set to increase gradually from a vertical section to a horizontal section. The first reflection surface 44 can have a horizontal cross-sectional shape different from a vertical cross-sectional shape, taking account of the lateral distribution of the low beam light distribution pattern P.

A distance (or major axis length) between the first and second focal points $F1_{44}$ and $F2_{44}$ of the first reflection surface 44 and the eccentricity can be determined so that the light from the light source 26, the light being internally reflected by the first light reflection surface 44 and condensed on near the focal point $F_{48}$ of the emission surface 48, is collected by the emission surface 48. The emission surface 48 can thus collect a greater amount of light for improved light use efficiency.

A reference axis $AX_{44}$ (major axis) of the first reflection surface 44 can be tilted about near the focal point $F_{48}$ of the emission surface 48 at an angle of θ2 with respect to the reference axis $AX_{40}$ which extends in a front-to-rear direction of the vehicle (see FIG. 7). The reference axis $AX_{44}$ is tilted so that the light from the light source 26, the light being internally reflected by the first reflection surface 44 and condensed on near the focal point $F_{48}$ of the emission surface 48, can be collected by the emission surface 48. This can reduce the size of the emission surface 48 and collect a greater amount of light by the emission surface 48 as compared to when the reference axis $AX_{44}$ (major axis) of the first reflection surface 44 is not tilted with respect to the reference axis $AX_{40}$ (i.e., when the angle θ2=0°).

The second reflection surface 46 can be configured to internally reflect at least part of the light from the light source 26, the light being internally reflected by the first reflection surface 44. For example, the second reflection surface 26 can be configured as a reflection surface of flat shape extending horizontally backward (or extending obliquely downward and backward) from near the focal point $F_{48}$ of the emission surface 48.

A front edge 46a of the second reflection surface 46 can include an edge shape that blocks part of (an image formed near the focal point $F_{48}$ of the emission surface 48 by) the light from the light source 46, the light being internally reflected by the first reflection surface 44, to form the cutoff lines CL to CL3 of the low beam light distribution pattern P. The front edge 46a can be located near the focal point $F_{48}$ of the emission surface 48.

The second reflection surface 46 can have a tilt angle θ3 (not shown) with respect to the reference axis $AX_{40}$ (or horizontal plane). The tilt angle θ3 can be determined so that light incident on the second reflection surface 46 in the light from the light source 26, the light being internally reflected by the first reflection surface 44, can be internally reflected by the first reflection surface 48 and the reflected light can be taken in by the emission surface 48 with high efficiency. The emission surface 48 can thus collect a greater amount of light for improved light use efficiency.

Figure 8:
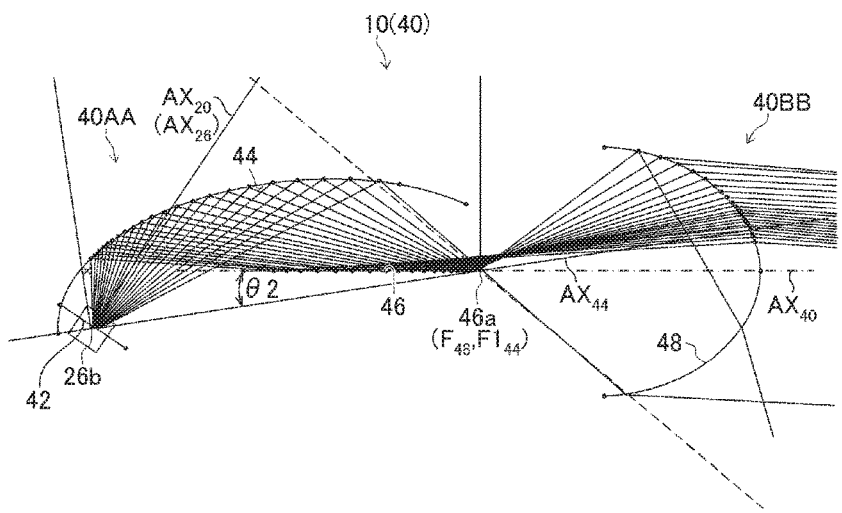
FIG. 8 is a longitudinal cross-sectional view showing how the light from the light source 26 (light source center point 26a of the wavelength conversion member 26) is refracted in condensing directions at the incident surface 42 and travels inside the lens body 40.
Figure 9:
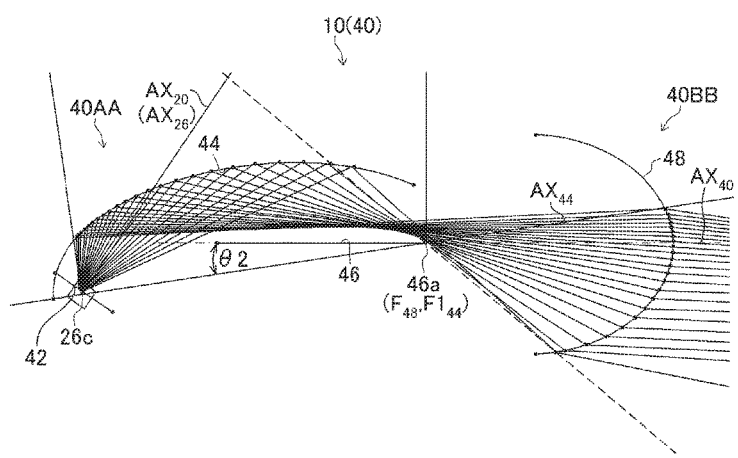
FIG. 9 is a longitudinal cross-sectional view showing how the light from the light source 26 (a light source rear end point 26c of the wavelength conversion member 26) is refracted in condensing directions at the incident surface 42 and travels inside the lens body 40.

In particular, the angle θ3 can be desirably such that the light internally reflected by the second reflection surface 46 in the light from the light source 26 (light source front end point 26b of the wavelength conversion member 26), the light entering the interior of the lens body 40 from the incident surface 42 and being internally reflected by the first reflection surface 44, can be sufficiently collected by the emission surface 48. FIG. 8 is a cross-sectional view showing how the light from the light source 26 (light source front end point 26b of the wavelength conversion member 26) is refracted in condensing direction at the incident surface 42 and travels inside the lens body 40. FIG. 9 is a cross-sectional view showing how the light from the light source 26 (light source rear end point 26c of the wavelength conversion member 26) is refracted in condensing directions at the incident surface 42 and travels inside the lens body 40.

The angle θ3 can be desirably such that part of the light from the light source 26 (the light source center point 26a and the light source front end point 26b of the wavelength conversion member 26), the light entering the interior of the lens body 40 and being internally reflected by the first reflection surface 44, can be blocked by the front edge 46a of the second reflection surface 46, and such that the light emitted from the emission surface 48 and projected forward is not blocked.

In view of the foregoing, the present exemplary embodiment employs an angle θ3=0°.

The emission surface 48 can be a convex lens surface that is convex forward. The emission surface 48 projects a luminous intensity distribution (light source image) formed near the focal point $F_{48}$ of the emission surface 48 by the light from the light source 26, the light being totally reflected by the first reflection surface 44, to in front of the vehicle.

Figure 10:
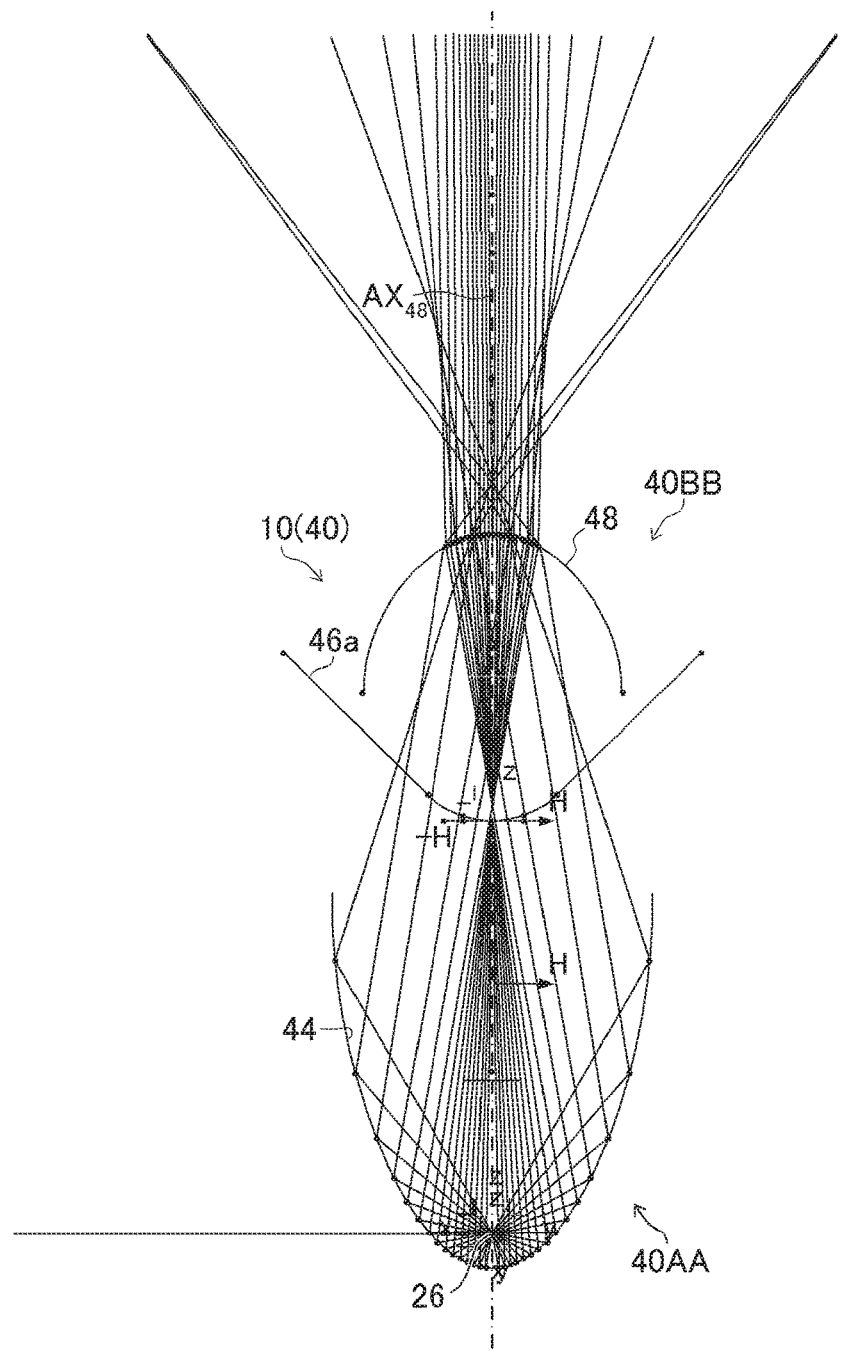
FIG. 10 is a cross-cross-sectional view showing how the light from the light source 26 is refracted in condensing directions at the incident surface 42 and travels inside the lens body 40.

The focal point $F_{48}$ of the emission surface 48 coincides with the first focal point $F1_{44}$ of the first reflection surface 44. In the vertical direction, the light from the light source 26, the light entering the interior of the lens body 40, can thus be condensed on the first focal point $F1_{44}$ by the first reflection surface 44, and emitted as parallel light from the emission surface 48 and projected to in front of the vehicle (see FIGS. 7 to 9). In the horizontal direction, the light from the light source 26, the light entering the interior of the lens body 40, can be internally reflected by the first reflection surface 44, and emitted as laterally diffused light from the emission surface 48 and projected to in front of the vehicle (see FIG. 10).

As shown in FIG. 5, light obtained by blocking part of the light from the light source 26 with the front edge 46a of the second reflection surface 46, the light entering the interior of the lens body 40 from the incident surface 42 and being internally reflected by the first reflection surface 44, and the light internally reflected by the second reflection surface 46 can be emitted from the emission surface 48 and projected forward. Here, the light partly blocked with the second reflection surface 46 can be emitted from the emission surface 48 (mostly the surface below the reference axis $AX_{40}$). The light internally reflected by the second reflection surface 46 can be emitted from the emission surface 48 (mostly the surface above the reference axis $AX_{40}$) and travels toward the road. That is, the light internally reflected by the reflection surface 46 can be folded along the front edge 46a of the second reflection surface 46 to overlap with the region below the cutoff lines CL1 to CL3. This can form the low beam light distribution pattern P including the cutoff lines CL1 to CL3 defined by the front edge 46a of the second reflection surface 46 at the upper edge.

According to the present exemplary embodiment, the lens body 40 in which metal deposition, a cause of cost increase etc., can be omitted and which can suppress the occurrence of reflection loss (light loss), and the vehicle lighting fixture 10 including the same can be provided.

There may be two reasons. The first reason is that the light within the predetermined angular range (for example, light of high relative intensity within the range of ±60° with respect to the optical axis $AX_{26}$ of the light source 26) in the light from the light source 26 can be refracted in condensing directions and enter the interior of the lens body 40. The incident angle of the light within the predetermined angular range to the first reflection surface 44 can thus be made greater than or equal to the critical angle (the light within the predetermined angular range can be totally reflected). The second reason is that the optical axis $AX_{26}$ of the light source 26 can be tilted at the angle θ1 with respect to the vertical axis V so that the incident angle of the light from the light source 26, the light entering the interior of the lens body 40 (refracted light), to the first reflection surface 44 can be greater than or equal to the critical angle (the refracted light is totally reflected).

The angle θ1 can be determined so that the incident angle of the light from the light source 26, the light entering the interior of the lens body 40 (refracted light), to the first reflection surface 44 becomes greater than or equal to the critical angle. The angle θ1 changes with the material (refractive index) of the lens body 40, the shape (size, focal position $F_{48}$, etc.) of the emission surface 48, the shape (major axis length and the tilt angle θ2 of the reference axis $AX_{44}$ (major axis) of the first reflection surface 44 with respect the reference axis $AX_{40}$) of the first reflection surface 44, etc. The angle θ1 is thus difficult to express by a specific numerical value or the like.

However, the angle θ1 at which the incident angle of the light from the light source 26, the light entering the interior of the lens body 40 (refracted light), to the first reflection surface 44 becomes greater than or equal to the critical angle can be found out by a simulation. For example, the angle θ1 can be found out by using predetermined simulation software to check (keep track of) the optical paths of the light from the light source 26 (for example, a group of rays of light from the light source center point 26a), the light entering the interior of the lens body 40 from the incident surface 42, each time at least one of the material (refractive index) of the lens body 40, the shape (size, focal position $F_{48}$, etc.) of the emission surface 48, the shape (major axis length and the tilt angle θ2 of the reference axis $AX_{44}$ (major axis) of the first reflection surface 44 with respect the reference axis $AX_{40}$) of the first reflection surface 44, etc. is changed (adjusted).

The inventor of the present application has conducted a simulation to determine a condition under which if the light within the range of ±600 with respect to the optical axis $AX_{26}$ of the light source 26 in the light from the light source 26 is refracted in condensing directions and enters the interior of the lens body 40, the incident angle of the reflected light entering the interior of the lens body 40 to the first reflection surface 44 becomes greater than or equal to the critical angle and a greater amount of light is collected by the emission surface 48.

As a result, a fairly satisfactory result was obtained if the lens body 40 was made of glass, the distance between the focal point $F_{48}$ of the emission surface 48 and the center (apex) of the emission surface 48 was 15.2 mm, the major axis length of the first reflection surface 44 was 20 mm, the angle θ1=42.5°, and the angle θ2=8.5°.

Next, modifications will be described.

The foregoing exemplary embodiment has described the case where the presently disclosed subject matter is applied to the lens body 40 that is configured to form the low beam light distribution pattern P (see FIG. 3) including the cutoff lines CL1 to CL3 at the upper edge. However, this is not restrictive. For example, the presently disclosed subject matter may be applied to a lens body configured to form a fog lamp light distribution pattern, a lens body configured to form a high beam light distribution pattern, and other lens bodies. For example, a lens body configured to form a high beam light distribution pattern can be constructed by omitting the second reflection surface 46 of the lens body 40 and adjusting the surface shape of the first reflection surface 44 etc.

In the foregoing exemplary embodiment, the reference axis $AX_{44}$ (major axis) of the first reflection surface 44 is tilted at the angle θ2 with respect to the reference axis $AX_{40}$. However, this is not restrictive. The reference axis $AX_{44}$ (major axis) of the first reflection surface 44 does not need to be tilted with respect to the reference axis $AX_{40}$ (i.e., the angle θ2=0°). Even in such a case, the size of the emission surface 48 can be increased to efficiently take in the light from the light source 26, the light being internally reflected by the first reflection surface 44.

The numerical values described in the foregoing exemplary embodiment and the modifications are all illustrative, and different numerical values may be used as appropriate.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting fixture comprising:

a light source having a light emission surface with a light source front end point and a light source rear end point in a vertical cross section; and a lens body arranged in front of the light source, the lens body being configured to include a rear end portion and a front end portion, light from the light source entering an interior of the lens body being emitted from the front end portion and projected forward to form a predetermined light distribution pattern including a cutoff line at an upper edge thereof, the lens body comprising:

an incident portion where light within a predetermined angular range with respect to an optical axis of the light source in the light from the light emission surface of the light source is refracted in a condensing direction and enters the interior of the lens body, the incident portion being separated away from, and facing to, the light emitting surface;

a first reflection surface configured to internally reflect the light from the light emission surface of the light source, the light entering the interior of the lens body; and a second reflection surface configured to internally reflect at least part of the light having been internally reflected by the first reflection surface, wherein the optical axis of the light source is tilted with respect to a vertical axis so that an incident angle of the light from the light emission surface of the light source, the light entering the interior of the lens body, to the first reflection surface is greater than or equal to a critical angle, the rear end portion is configured to include the incident portion and the first reflection portion;

the front end portion is configured to include an emission surface that is a convex lens surface, the second reflection surface is configured as a reflection surface extending to the rear end portion from near a focal point of the emission surface, light obtained by blocking part of the light from the light source with a front edge of the second reflection surface, the light entering the interior of the lens body and being internally reflected by the first reflection surface, and the light internally reflected by the second reflection surface can be emitted from the emission surface and projected forward to form the predetermined light distribution pattern including a cutoff line defined by the front edge of the second reflection surface at the upper edge, the first reflection surface has a surface shape configured such that the light from the light source, the light having been internally reflected by the first reflection surface, is condensed on or near the focal point of the emission surface at least in a vertical direction, the first reflection surface is configured as a reflection surface of an elliptical shape having a first focal point set near the focal point of the emission surface and a second focal point set near a virtual focal point that is an intersection formed by extending refracted rays of light in reverse directions, the refracted rays of light being the light from a center of the light emission surface of the light source, the light entering the interior of the lens body from the incident portion, the first reflection surface has a reference axis that is tilted about near the focal point of the emission surface with respect to a vehicle reference axis extending in a front-to-rear direction of a vehicle body so that the light from the light source, the light being internally reflected by the first reflection surface and condensed on or near the focal point of the emission surface, is collected by the emission surface, the reference axis of the first reflection surface is a straight line connecting the first focal point and the second focal point of the first reflection surface, the reference axis of the first reflection surface is tilted such that the reference axis on a side of the rear end portion is directed downward and the reference axis on a side of the front end portion is directed upward when viewed in the vertical cross section thereof, the second reflection surface is configured to include a front edge, which is configured such that almost all the light emitted from the light source rear end point of the light emission surface and entering the lens body reaches the emission surface without being reflected by the second reflection surface, the second reflection surface is configured to reflect the light emitted from the light source front end point of the light emission surface and entering the lens body and having been reflected by the first reflection surface, and the convex lens surface of the emission surface has a focal point coincident with the first focal point of the first reflection surface in the vertical cross section thereof and is configured to project the light as laterally diffused light in a horizontal cross section.

2. The vehicle lighting fixture according to claim 1, wherein the emission surface has a surface shape configured such that light past near the focal point of the emission surface is emitted in a direction generally parallel to the vehicle reference axis at least in terms of a vertical direction.

3. The vehicle lighting fixture according to claim 2, wherein a distance between the first focal point and the second focal point of the first reflection surface and an eccentricity of the first reflection surface are determined so that the light from the light source, the light being internally reflected by the first reflection surface and condensed on or near the focal point of the emission surface, is collected by the emission surface.

4. The vehicle lighting fixture according to claim 3, wherein the second reflection surface is tilted with respect to the vehicle reference axis so that light internally reflected by the second reflection surface out of light from the light source front end point of the light source, the light entering the interior of the lens body and being internally reflected by the first reflection surface, is collected by the emission surface.

5. The vehicle lighting fixture according to claim 2, wherein the second reflection surface is tilted with respect to the vehicle reference axis so that light internally reflected by the second reflection surface out of light from the light source front end point of the light source, the light entering the interior of the lens body and being internally reflected by the first reflection surface, is collected by the emission surface.

6. The vehicle lighting fixture according to claim 5, wherein the second reflection surface is tilted with respect to the vehicle reference axis so as not to block light that is obtained by blocking part of light from a center point and the light source front end point of the light source with the front edge of the second reflection surface, the light entering the interior of the lens body and being internally reflected by the first reflection surface, and is emitted from the emission surface and projected forward.

7. The vehicle lighting fixture according to claim 1, wherein a distance between the first focal point and the second focal point of the first reflection surface and an eccentricity of the first reflection surface are determined so that the light from the light source, the light being internally reflected by the first reflection surface and condensed on near the focal point of the emission surface, is collected by the emission surface.

8. The vehicle lighting fixture according to claim 7, wherein the second reflection surface is tilted with respect to the vehicle reference axis so that light internally reflected by the second reflection surface out of light from the light source front end point of the light source, the light entering the interior of the lens body and being internally reflected by the first reflection surface, is collected by the emission surface.

9. The vehicle lighting fixture according to claim 8, wherein the second reflection surface is tilted with respect to the vehicle reference axis so as not to block light that is obtained by blocking part of light from a center point and the light source front end point of the light source with the front edge of the second reflection surface, the light entering the interior of the lens body and being internally reflected by the first reflection surface, and is emitted from the emission surface and projected forward.

10. The vehicle lighting fixture according to claim 1, wherein the second reflection surface is tilted with respect to the vehicle reference axis so that light internally reflected by the second reflection surface out of light from the light source front end point of the light source, the light entering the interior of the lens body and being internally reflected by the first reflection surface, is collected by the emission surface.

11. The vehicle lighting fixture according to claim 10, wherein the second reflection surface is tilted with respect to the vehicle reference axis part of light from a center point and the light source front end point of the light source with the front edge of the second reflection surface, the light entering the interior of the lens body and being internally reflected by the first reflection surface, so that a remaining part of the light not blocked is emitted from the emission surface and projected forward.

12. A vehicle lighting fixture comprising:
a light source including a semiconductor laser element, and a wavelength conversion member configured to receive laser light from the semiconductor laser element and convert at least part of the laser light into light of a different wavelength, the wavelength conversion member having a plate shape and serving as a light emission surface, the light emission surface having a light source front end point and a light source rear end point in a vertical cross section; and
a lens body arranged in front of the light emission surface of the light source, the lens body being configured to include a rear end portion and a front end portion, light from the light source entering an interior of the lens body being emitted from the front end portion and projected forward to form a predetermined light distribution pattern, the lens body comprising:
an incident portion configured to be separated away from, and face to, the light emission surface, and have a surface of a flat shape parallel to a straight line connecting the light source front end point and the light source rear end point in a vertical cross section; and
a first reflection surface configured to internally reflect the light from the light emission surface of the light source, the light entering the interior of the lens body, wherein
the optical axis of the light source is tilted with respect to a vertical axis so that an incident angle of the light from the light source, the light entering the interior of the lens body, to the first reflection surface is greater than or equal to a critical angle,
the front end portion is configured to include an emission surface that is a convex lens surface,
the light from the light source, the light entering the interior of the lens body from the incident portion and having been internally reflected by the first reflection surface, is emitted from the emission surface and projected forward to form the predetermined light distribution pattern,
the first reflection surface has a surface shape configured such that the light from the light source, the light having been internally reflected by the first reflection surface, is condensed on or near the focal point of the emission surface at least in a vertical direction,
the first reflection surface has a reference axis that is tilted about near the focal point of the emission surface with respect to a vehicle reference axis extending in a front-to-rear direction of a vehicle body so that the light from the light source, the light being internally reflected by the first reflection surface and condensed on or near the focal point of the emission surface, is collected by the emission surface, the reference axis of the first reflection surface is a straight line connecting the first focal point and the second focal point of the first reflection surface, the reference axis of the first reflection surface is tilted such that the reference axis on a side of the rear end portion is directed downward and the reference axis on a side of the front end side is directed upward when viewed in the vertical cross section thereof, the convex lens surface of the emission surface has a focal point coincident with the first focal point of the first reflection surface in the vertical cross section thereof and is configured to project the light as laterally diffused light in a horizontal cross section.

13. The vehicle lighting fixture according to claim 12, wherein the emission surface has a surface shape configured such that light past near the focal point of the emission surface is emitted in a direction generally parallel to the vehicle reference axis at least in terms of a vertical direction.

14. The vehicle lighting fixture according to claim 13, wherein a distance between the first focal point and the second focal point of the first reflection surface and an eccentricity of the first reflection surface are determined so that the light from the light source, the light being internally reflected by the first reflection surface and condensed on near the focal point of the emission surface, is collected by the emission surface.

15. The vehicle lighting fixture according to claim 12, wherein a distance between the first focal point and the second focal point of the first reflection surface and an eccentricity of the first reflection surface are determined so that the light from the light source, the light being internally reflected by the first reflection surface and condensed on near the focal point of the emission surface, is collected by the emission surface.

\* \* \* \* \*